United States Patent Office 3,746,578
Patented July 17, 1973

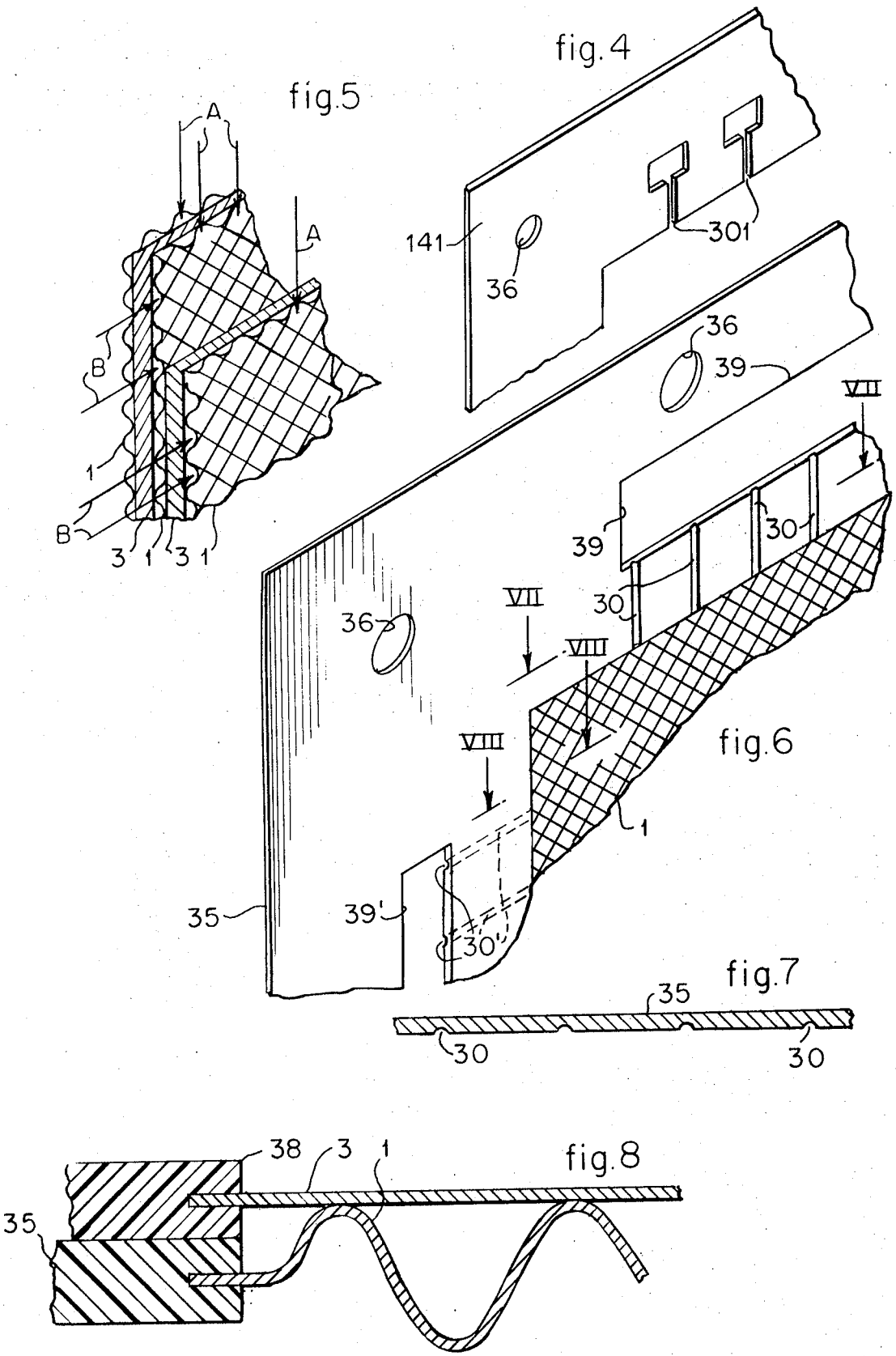

3,746,578
FUEL CELL BATTERY
Bernard Warszawski, Paris, France, assignor to Societe Generale de Constructions Electriques et Mecaniques (Alsthom)
Filed Mar. 10, 1971, Ser. No. 123,110
Claims priority, application France, Feb. 24, 1967, 2,731, 2,732
Int. Cl. H01m 27/02
U.S. Cl. 136—86 R                            21 Claims

ABSTRACT OF THE DISCLOSURE

To enable use of a carrier electrolyte having a reactant therein, fuel cell units may be stacked together, each fuel cell being formed of an embossed electrode having protuberances extending on at least one side, or possibly on alternate sides and separated from each other by semipermeable diaphragms. In the case of a battery the electrodes are thin sheets held within a plastic frame, embossed to have the protuberances extending by several tenths mm., for example 0.5 mm., and the sides are preferably coated with catalysts. The marginal portions of the frames, the electrodes and diaphragms and spacer elements if used, are formed with openings to provide the stack with two electrolyte supply and drain systems. Opposite faces of the electrodes are in communication with alternate supply systems of electrolyte charged with reactant by fine ducts or microchannels, so that the electrolyte can wash over the faces of the electrodes. The electrolyte applied to one system includes a reducing agent, and to the other an oxidizing agent, to provide anodic and cathodic electrode surfaces, respectively, separated by permeable diaphragms. At least one of the additive agents may be a non-regeneratable material, soluble in the electrolyte. The additive agents may be also emulsified non-soluble gaseous or liquid material.

Cross-references to related patents. — Inventor, B. Warzawski; U.S. Pats. Nos.: 3,511,713, 3,513,032, 3,516,-866, and 3,518,122; issue dates: May 12, 1970; May 19, 1970, June 23, 1970, and June 30, 1970, respectively.

The present invention is a continuation-in-part of prior applications Ser. Nos. 708,302 and 708,338 (both now abandoned) both by the same inventor and both filed Feb. 26, 1968, and claiming a priority of French applications 2731 and 2732, both filed in Belfort on Feb. 24, 1967.

The present invention relates to fuel cells and to fuel cell batteries and, more particularly, to fuel cell batteries using an electrolyte which acts as a carrier for reactants, and in which a large number of cells may be stacked together to provide substantial fuel cell output.

Fuel cells have been proposed which utilize a porous electrode permitting diffusion of gas therethrough. Unfortunately, certain disadvantages attendant to the use of such cells have restrained its industrial acceptance. Electrodes permitting gaseous diffusion pose technological problems in connection with their porous structure, primarily due to difficulties in manufacture of suitable sintered materials; further, the pores may become clogged by electrolyte. It is well known that electrodes for gaseous diffusions are complex, difficult to reproduce, heavy and bulky.

Besides the technical difficulties, a more fundamental problem associated with such cells is the necessity to utilize electrolytes which are on the one hand heavily buffered and further must be heavily conductive.

The above requirements resulted in restriction of the reaction zones beneath the capillary film of a meniscus mass, itself separated from the bulk of the electrolyte by stationary liquid filling the first layer, or layers of pores. Ion transfer between the reaction zone and the bulk of the electrolyte thus can occur only by migration and diffusion across this stationary liquid in the capillary film and only from the first layer of pores. This is the reason for the use of the heavily buffered and heavily conductive electrolyte in order to avoid pH polarization as well as reduction of the reaction zone to a very small area. As electrolyte, concentrated acid or basic solutions have thus been utilized, since it is well known that the performance of fuel cells with gaseous diffusion electrodes operating in saline solution is low.

As a result, cells utilizing an acid electrolyte are expensive, because it was thought necessary, up to now, to utilize catalysts of platinum or metals of its family. The basic-electrolyte type cells, on the other hand, pose problems of decarbonization, if a carbon-type combustible is utilized, and further of generation of low-purity hydrogen, as well as air contamination, all of which form problems which have not really been solved up to date.

The reaction zones, and the slowness of the diffusion-type exchanges with the bulk of the electrolyte, increase the problem of poisoning of the electrolyte by impurities in industrial gases. It is difficult to provide a method to clean, purify or reactivate, or even change catalysts which have been poisoned without complete dismantling or even destruction of a battery. The useful life of the battery thus depends on the change in catalyst from the time it is first used. Operation of a plurality of porous electrodes is further impeded by the simple presence of inert dilutants in the reactive gases, which further obstruct the pores.

The weight and the volume of diffusion-type electrodes for gaseous diffusion are the primary obstacle to reduce the weight and the volume of battery assemblies. The large weight and great volume render fuel cells practically useless for mobile applications.

French patents Nos. 1,379,800 (corresponding British 1,081,408) and 1,399,765 (corresponding British 1,097,-428) describe fuel cell which operate with electrolytes containing reactants which are redox couples, and permitting combinations of a great number of elementary cells to form a battery. Every elementary cell is divided into two half-cells by a semipermeable diaphragm; every redox couple is dissolved in an electrolyte and this charged electrolyte is circulated in the cells in such a manner that it traverses the assembly of half-cells for which it is intended, flowing along the corresponding electrodes from one edge of every electrode to the opposite edge, and parallel to the median plane of the electrode. The battery is built up by repetitive stacking of cell components which are additionally perforated at their margins to form, in assembly, ducts for the electrolyte. Each half-cell contains an electrode whose central part presents a lattice structure, such as a sheet of expanded metal, a sheet which is offered or embossed with projections or protuberances or the like. These sheet electrodes are pressed between a semipermeable diaphragm, separating two half-cells and a separator, hydraulically insulating two consecutive elementary cells.

The above referred to compact assemblies were used only with electrochemically and thermodynamically reversible redox couples as reactants, which have a high reaction rate.

It appeared very difficult, in such an assembly of a great number of cells, to obtain reaction of non-regeneratable i.e. electrochemically and thermodynamically non-reversible oxidizing agents or reducing agents which are soluble in the electrolytes or non-soluble agents emulsified in the electrolyte. The direct use of reducing agents and oxidizers which are soluble and not regeneratable such as hydrazine, ammonia, sodium sulfide, methanol, hydrogen peroxide, sodium hypochloride, sodium chlorite, etc. or non-soluble emulsified agents such as liquid octane, gaseous air, oxygen, hydrogen, etc. generally requires a catalyst for the electrodes. Yet, as known, it is difficult to obtain strictly identical catalytic activity from one electrode to another. Electric cooperation of a very great number of elementary cells is possible only, however, if their operating characteristics are very close to each other.

Experiments, and research, has shown contrary to what could be expected, that soluble non-regeneratable oxidizing and reducing agents, introduced by way of a solution into the electrolyte, or non-soluble emulsified or dispersed agent forming an emulsion with the electrolyte, can be used in the assemblies referred to above, yielding surprisingly high power output, while still obtaining excellent electric cooperation between several hundreds of elements.

It is believed that the dispersive effect of catalysts on the performance of the cells is small at low current densities, the effect becoming important only when the end of the current-voltage characteristic curve is approached.

When the fuel cells are stacked longitudinally to provide a fuel cell battery, difficulties arise if the electrolyte is highly conductive. There are only a few catalysts which are not attacked by the concentrated acid or basic electrolyte, and these few are expensive. Moreover, the cells are electrically in series and the electrolyte forms a short circuit, decreasing from the net output available from the battery and contributing to heating and other problems. Additionally, it has been found very difficult to obtain uniform, even output from the individual cells of the battery so that any one cell is not overloaded with respect to any other but can cooperate in a stack containing a large number of cells.

It is an object of the present invention to provide a fuel cell in which the disadvantages of the prior art are essentially avoided, while such advantages as manufacturing simplicity and economy in construction can be retained, and which has high output and can be constructed with a large number of cells.

Subject matter of the present invention.—Briefly, the fuel cell battery utilizes a stack of cell elements. Each cell element is formed of embossed or goffered electrode material. Protuberances are formed transverse of the plane of the electrode by embossing, for example and of such size that turbulence is caused in fluid passing over, or washing over, the face of the electrode to provide for thorough wetting thereof. The protuberances extend from the basic plane of the electrode by distances of about 0.1 to 1 mm.

According to the invention, especially for a battery utilizing a stack of a big number of cells, each cell element is formed of a thin sheet for example, from a few hundredths to a tenth of a millimeter. The sheets may be about 10 cm. square, this dimension not being critical and being determined essentially by the nature and strength of the electrode material. The protuberances are then formed transverse of the sheet by goffering or embossing and extend, alternately, in both directions from the median plane of the sheet by distances of about 0.1 to 1 mm. For a sheet of 0.05 mm. thickness, protuberances of about 0.25 mm. lateral excursion from the median plane of the sheet have been found suitable. The sheet structure may be a material such as metallic gauze or expanded metal sheet, on a solid backing, or a combination of the foregoing. Metal lattice or woven mats on a backing are also suitable. An embossed sheet of an electrically conductive material, having projections or protuberances formed thereon, extending essentially symmetrically from the median plane of the sheet is preferred. The electrode may be made also of plastic material, charged so as to make it electrically conductive, by example with a powder such as carbon. The solution or emulsion is constrained to pass or wash over the network of the protuberances of the electrodes themselves. At the same time, ion communication is insured with the electrolyte, which is in contact with the other electrode of the battery. A semipermeable diaphragm separates facing electrodes, each washed over by electrolytes with different type reactants, to provide ion communication. A spacer, interposed between the diaphragm and the electrode, or a frame around the electrode, of about the same thickness as the goffered or embossed region of the electrode, allows this region to be in close proximity to, or in elastic contact with the adjacent surface of the diaphragms when stacked. The edge of the spacer may have a thickness such that the total thickness formed by the edge parts of the electrode, of the diaphragm and of the spacer is the same as the total thickness formed by the elements at the centre of the stack, i.e. the total thickness formed by the diaphragm and the electrode.

Although fuel cells according to the present invention have a particular advantage when forming stacks comprising a great number of elements, due in particular to the possibility of forming very thin electrodes which enable a compact stacking of a great number of lightweight elements in a small space, it can be understood that it is possible to use a single fuel cell for the production of electricity when the intensity and voltage required correspond to the performances of such a fuel cell.

In this case, of course, only one surface of the electrode is active, and hence, the electrode can have any thickness, although there is no advantage in using material to no purpose, which, besides increasing the price, increases the weight and the volume of the cell.

It must be pointed out that until the present invention, it was well known that a cell structure with a non-porous electrode could not work with an emulsion. Notwithstanding, the power levels yielded by the fuel cells according to the invention are unexpectedly high. So it is another object of the present invention to provide a fuel cell unit having a liquid emulsion-type electrolyte therein, the electrolyte being a carrier of emulsified gaseous, such as air, oxygen, etc. or of non-soluble liquid reactants, such as octane for example, in an aqueous electrolyte. Said fuel cell having at least one electrode comprising a sheet of conductive material having an embossed or goffered surface configuration spreading the flow of electrolyte along the surface thereover, the flow openings between the bosses being in the order of from one-tenth to several tenths of a millimeter for directing the electrolyte along the surface, the sheet being fluid impervious or being backed by a fluid-impervious sheet so as to close off flow of electrolyte through said sheet.

The electrodes and the semipermeable diaphragms are stacked, alternately, to form stacked elementary cells. One face of each electrode is washed over by an electrolyte carrying a reactant which is an oxidizing agent; the other face with an electrolyte carrying a reactant which is a reducing agent. The electrode will thus be a bipolar electrode having opposite anodic and cathodic faces. The marginal portions of the components, or their frames, are pierced to form, when stacked, inlet and outlet ducts or conduits for the electrolyte extending perpendicularly to the plates or sheets. Flow rates of electrolyte of about 0.5 to 1 cm.$^3$/sec. per elementary cell of about 100 cm.$^2$ are suitable.

Communication between the ducts formed by the stacked sheets, and the edges of the faces of the electrodes, is provided by cut outs in intervening spacers, if used, or by fine channels or grooves extending from the ducts to the face of the electrode. These channels or ducts, which may be termed microchannels, are fine enough and long enough to introduce sufficient electrical resistance between adjacent plates so that short circuits between the plates through the electrolyte are essentially avoided and internal losses kept to a minimum. These microchannels provide an equalized pressure drop of the fluid washing over the face of the electrodes with respect to the pressure in the supply ducts; they also regulate and control distribution of electrolyte over the electrodes to insure uniform irrigation of the electrodes.

By providing an electrolyte which is only weakly conductive, for instance a half normal, normal, or 2 normal or 3 normal potassium or sodium hydroxide solution and fine microchannels which feed to the faces of the electrodes, high resistance will result between the cells or between one electrode and the mass of the electrolyte in the ducts as far as the electrolyte is concerned. Thus, it is possible to operate a large number of cells in a battery unit, for example in series connection. Higher alkali concentrations can be used with finer microchannels, if a long life of the cell is not necessary.

A battery of 2 kw. power has been constructed utilizing 180 cells, by stacking 180 bipolar electrodes and diaphragms. The overall thickness of an elementary half-cell is about 0.5 mm. The cell is used with a normal potassium hydroxide solution as an electrolyte, and with normal hydrazine as reducer, and normal hydrogen peroxide as an oxidizer. The semipermeable diaphragms are very thin (about 0.1 mm.) and contribute very little to the overall thickness of the half-cell. A standard module of this batery may provide, for example, an output voltage of 24 v. by dividing the stack into 6 sub-stacks, or blocks, of 30 series-connected cells, the sub-stacks being connected in parallel. The power density of the entire unit is about 1 kw./dm.$^3$.

The invention will be described by way of example with reference to the accompanying drawings, wherein:

FIG. 4 is a fragmentary perspective view of a spacer with cut outs forming microchannels;

FIG. 5 is a fragmentary perspective view, to an enlarged scale, of an electrode and membrane assembly;

FIG. 6 is a perspective view, to an enlarged scale, of an electrode in a preformed frame, illustrating the ducts and channels through which electrolyte is applied to a face of the electrode;

FIG. 7 is a cross-sectional view along line VII—VII of FIG. 6 and illustrating microgrooves or channels for electrolyte;

FIG. 8 is a fragmentary cross-sectional view along lines VIII—VIII illustrating an electrode and a diaphragm in frames, in cross-section.

Figure 1:
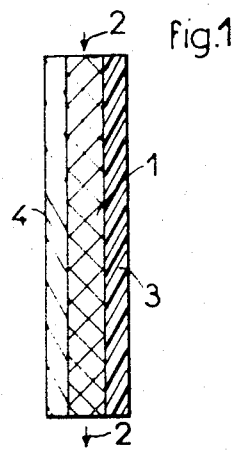
FIG. 1 illustrates in a schematic longitudinal cross-sectional view a basic half-cell structure.
Figure 2:
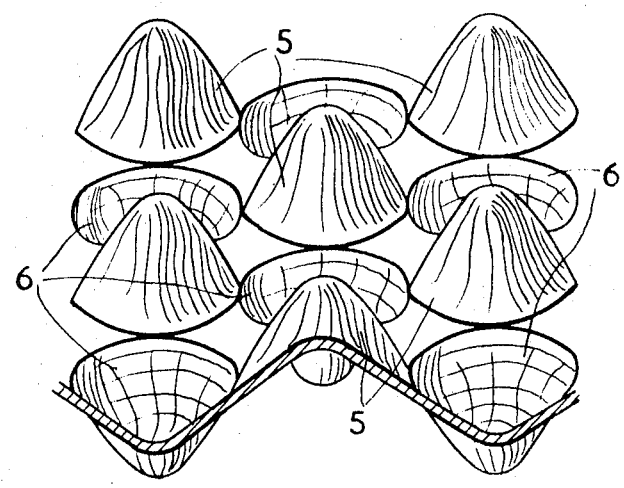
FIG. 2 is a perspective view of a portion of a preferred embodiment of an electrode.

Referring now to the drawings and particularly to FIGS. 1 and 2: an electrode 1 of embossed structure (FIG. 2) is aranged against a closing surface 4, forming one end of the electrode assembly. On the other side, a semipermeable diaphragm 3, or membrane, is applied to the electrode, directly against a face thereof, in order to provide for ion communication with the electrolyte which is in direct contact with the other electrode of the cell, not shown in FIG. 1, and placed symmetrically against diaphragm 3 at the right side thereof. A reactant, dissolved or emulsified in an electrolyte, is passed over the electrode in the direction of the arrow 2. The region thus traversed by the electrolyte is limited on one side by the electrode 1 and on the other by the diaphragm or membrane 3.

The surface 4 and electrode 1 can be assembled as a single piece which may be an embossed, conductive sheet having a network of projections or protuberances, the ends of which are applied against the semipermeable diaphragm 3. Preferably, these protuberances are staggered, with respect to the average direction of flow of the electrolyte so that straight flow of the electrolyte will be constantly impeded, the electrolyte being spread over the electrode in order to improve wetting and ion delivery.

In order to decrease the voltage drop, due to resistance of the electrolyte, and further in order to simplify the manufacture of the electrodes and to reduce the thickness of the electrode structure when forming a stack, it is preferred in case of a reactant in emulsified form, to generate a single plane of bubbles or droplets of reactant rather than to have a thicker layer so that the reactant can form in superimposed layers. Such a single layer is preferably obtained by forming the electrode by embossing a thin, conductive sheet to provide a network of projections and protuberances, of approximately equal spacing and extent of projection. The dispersion of bubbles, drops or droplets is further improved by forming the electrode such that a group of cavities, regularly arranged, is connected by narrower passages. Such a structure preferably can be obtained, for example, by symmetrically embossing a thin conductive sheet with two networks of protuberances, extending in opposite directions from the major plane of the thin sheet, as best seen in FIG. 2, in which protuberances 5 extend to the top side of the major plane of the sheet, and the protuberances extending towards the bottom side form depressions 6 with respect to the median plane of the sheet facing the top side.

The structure of FIG. 2 which is a preferred one, has additional advantages. As seen from the figure, two groups of projections, extending in opposite directions, provide for hydraulic separation of fluid, but, being formed from a single sheet, are electrically connected. Such a thin, embossed sheet may thus form a bi-polar electrode, each face of which may function as one electrode in contact with an electrolyte which carries one type of reactant, in solution or emulsion. A group of such electrodes is connected in a stack or battery, and the two reactants are separated without causing problems of electrical connection. Passage of current is across the thickness of the thin sheet. It is possible to make the thin sheet not only of metal but, for example, of a conductive plastic, such as plastic charged with graphite or carbon. Such substances, having a resistance which is too high for connection with an ordinary connector, still permit passage of current thereacross, that is across the thickness of the sheet, since the current passes only for a very short distance.

The electrode is preferably surface treated with a catalyst, appropriate to the nature of the reactants used. The emulsion constantly sweeps across the entire surface of the electrode with the catalyst. The electrolyte ducts may also be used for other liquids after draining of the electrolyte, for example, substances to clean, to renew, or recondition the cells, or the catalyst, directly, or in emulsion or solution. Thus, the cell can be cleaned and reactivated without disassembly. Periodic reconditioning of an entire battery in the same manner is entirely possible, similar to the flushing of an internal combustion engine. Consequently, the life span of the entire battery is very much higher and totally different from those which utilize gaseous diffusion electrodes.

A plurality of fuel cells forming a battery, of the redox-system type, have previously been proposed (see, for example, the aforementioned French Pat. 1,379,800). Such a battery of fuel cells is formed by repetitively stacking single cells, usually formed of thin embossed plates, and thin, semipermeable diaphragms in such a manner as to divide each elemental cell in two half-cells; and introducing an electrolyte to each one of the half-cells which carries the reactants, either as an oxidizing agent or as a reducing agent, depending upon whether the half-cell under consideration is cathodic or anodic. The individual half-cells are formed with openings which, after stacking, form supply and removal ducts for the electrolytes, arranged perpendicular to the plate-like electrodes. Grooves, notches, or spaces are then provided in order to permit the electrolyte to pass parallel to the major plane thereof, after having been led to the electrode sheets or plates themselves by the ducts.

In accordance with the invention, the electrodes are so shaped that the thickness of a half-cell is in the order of one to several tenths of a millimeter, to allow for passage of an emulsion, solution, or suspension of reactant in an electrolyte thereover. A battery for use with a reactive, electrolytic emulsion is obtained by stacking a number of cells. At first it did not appear feasible that non-regeneratable gaseous or liquid reactants in an electrolyte in emulsified, or dispersed, or dissolved form could be introduced into an assembly of a large number of unit cells of this kind; difficulties were anticipated arising from dispersal, due to the catalyst, and from dispersion due to the inherent irregularity of distribution of emulsions, and consequential non-homogeneity of distribution of the emulsion along a large number of electrodes. Electrical cooperation of a large number of elemental cells thus was deemed to be particularly difficult.

Experiments have shown that, on the contrary, it is entirely possible to provide compact assemblies of unit cells, and to introduce oxidizing, as well as reducing gases or liquids as an emulsion or solution in the electrolyte, while still obtaining excellent electrical cooperation with even several hundreds of elemental cells and at substantial current output.

The assembly of the present invention can be vary compact and high power output at low unit volume can be obtained, yet with low current densities in the electrodes. The dispersing effect due to the use of the catalyst and the use of emulsions upon loading of the battery, will be small at low current densities, the bigger differences appearing only towards the higher end of the current vs. voltage load curve.

Figure 3:
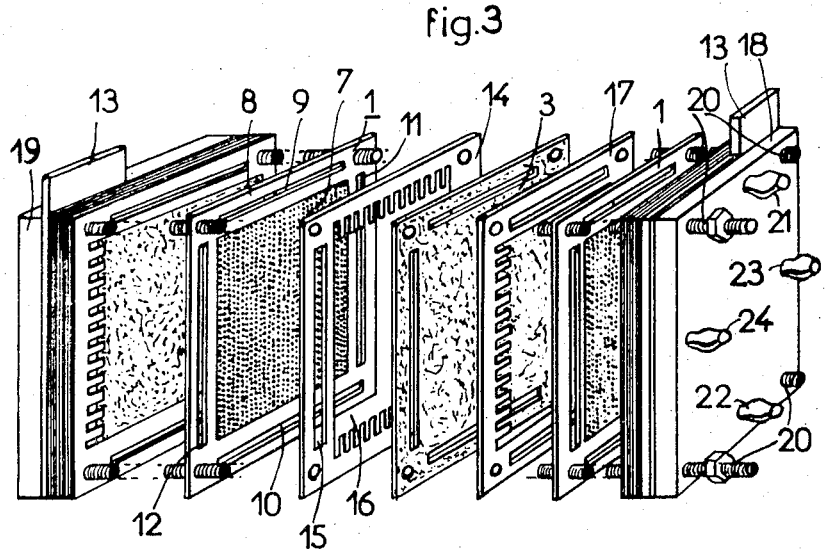
FIG. 3 illustrates, in schematic form and in partly exploded view, an assembled battery.

FIG. 3 illustrates an assembly of individual elementary cell forming a battery. A bi-polar electrode 1 separates two consecutive elementary half-cells. Electrode 1 consists of a metallic foil, or thin sheet of square outline, having a central region 7 which is embossed, and a flat marginal region 8, covered with an insulating varnish. The flat edge plate 8 is pierced with horizontal openings 9 and 10, and vertical openings 11 and 12. The end electrodes are formed with connection tabs 13 extending from the marginal flat ends. The flat circumferential portion 8 of the electrode may also be extended beyond the outside of the battery to form cooling tins.

A plastic spacer 14 is located between electrode 1 and a semipermeable diaphragm 3. Spacer 14 is pierced with two vertical openings 15, identical to openings 11 and 12. A central space 16, following in outline approximately the central region 7 of electrode 1, is left open in spacer 14. Spacer 14 has indentations or teeth cut inside of the horizontal end of space 16, and communicating at its lower end with the channel formed by the aligned openings 9 and 10. The toothed indentations prevent deformation of electrode 1 or diaphragm 3, which would interfere with passage of liquid electrolyte over the electrode.

The semipermeable diaphragms 3 is likewise formed with four openings, identical to openings 9, 10, 11 and 12 of the electrode 1. A frame, or spacer 17, is placed along and following diaphragm 3. It is identical to spacer 14, except that it is turned over 90° with respect to the spacer 14, and along the longitudinal axis of the battery. Another electrode 1 then is stacked to complete one elementary cell.

FIG. 4 illustrates an other form of spacer 141, in which the cut outs forming narrow openings 301 between the aforementioned indentations form microchannels when stacked between the edge parts of the diaphragm and of the electrode.

When the entire assembly is clamped together, the raised protuberances of the embossed regions of the electrodes extend through space 16 of frame 14 (or 17, or 141, respectively) and come in elastic contact with diaphragm 3, elastically compressing diaphragm 3. The thickness of the central portion of the electrodes is equal to the sum of the thicknesses of the peripheral flat portions of the adjacent spacer frames. The membranes or diaphragms 3 are so thin, 0.05 mm. to 0.1 mm. for example, that they contribute little to the overall thickness of an elementary cell.

A series of cells in accordance with the present invention may be stacked on each other to form an entire battery. The entire assembly is then locked between two terminal blocks 18 and 19 by studs and nuts 20 for example.

As will be apparent from the drawings, upon assembly, the various openings will define two horizontal and two vertical channels. Pipe stubs 21, 22 communicate with the horizontal channels and provide for circulation carrying an electrolyte with a reactant, oxidizing or reducing, respectively, in emulsion, solution, or suspension, to the face at the right of the electrodes 1 (with respect to FIG. 1 or FIG. 3). Pipe stubs 23, 24 communicate with the vertical channels and provide for application of electrolyte, carrying a reactant of opposite type (that is, reducing or oxidizing) in emulsion, solution or suspension to the other face of the electrode 1, that is, the left face in FIGS. 1 and 3.

One of the reagents of the electrolytes may be non-regeneratable. A suitable non-regeneratable material for oxidizing type electrolyte is hydrogen peroxide; and for reducing type electrolyte is hydrazine.

FIG. 5 is a greatly enlarged view illustrating three electrodes 1, placed against diaphragms 3, and the flow of the electrolyte in the direction of arrows A and B, respectively, over the faces thereof. The electrolyte itself is applied to the face of the electrodes, in accordance with the feature of the invention, by fine microgroove channels 30, 30' (FIG. 6), connecting with ducts 39, 39', through which electrolyte is applied. In the form of the invention illustrated in FIGS. 6 to 8, the electrodes 1 and diaphragms 3 are set into formed plastic frames 35 and 38, respectively, for example by being molded therein (see FIG. 8). The plastic frames have a sufficient thickness that they themselves act as holding frames for the electrode (and diaphragm, respectively) as well as spacers protecting the goffered protuberances from mechanical damage, upon compression of a large number of elements together. Thus, a frame 35 with electrode 1 set therein can be placed immediately adjacent frame 38 holding diaphragm 3 (see FIG. 8). The channels 30 are just deep enough and wide enough to provide for passage of fluid from the ducts to the face of the electrode, but still long enough so that each individual fluid path will cause, hydraulically, a pressure drop and electrically will form only a thin thread-like conductive path of comparatively high resistance to avoid any possible short circuit and internal electrical loading of the fuel cell by the electrolyte itself. The number of microgrooves supplying or taking electrolyte away may vary, and the dimensions thereof determined by flow and electrical considerations; a depth of grooves in the order of 0.1 mm. or less and a longitudinal extent of more or less 1 cm. has been found suitable. Three to ten such grooves have been found suitable to connect the edge of the electrode with one duct.

If the reactant is soluble in the electrolyte, it is preferably dissolved; if the reactant is insoluble, it is emulsified; it is not necessary that the electrolytes applied to opposite sides of an electrode be identical, or of the same concentration since the electrodes are impervious to liquid. The solution, or the emulsion, respectively, vigorously sweeps the catalyzed surface of the corresponding electrode. The electrolyte materials themselves operate at very low concentrations, enabling the use of cheap catalysts and materials on the electrodes themselves, and further permitting the operation of many cells in series-parallel. The microgrooves 30, 30' (FIGS. 6, 7) interconnecting the ducts and the faces of the electrodes themselves introduce a high resistance. There is always such a resistance between any electrode and the respective electrolyte drain lines.

Besides the reactants above referred to, fuel cells have been constructed utilizing oxidizers such as air, oxygen, hypochlorite and chlorite; as reducers, borohydride has also been used. The high dilution of the electrolyte used in the cells of the present invention makes application of catalysts to the faces of the electrodes particularly desirable. The active electrode surface, that is, the surface of electrode 1 wtihin the frames 35, may, for example, be about 10 x 10 cm. square; with the marginal areas, a total plane surface of about 14 x 14 cm. square will result. The battery having 200 cell elements (one electrode and one diaphragm each), together with the cover plates which may have formed therein cavities to place pump gears to pump the electrolyte, will be roughly cube-shaped. The electrodes themselves may be of nickel, silver or various nickel and silver alloys; plastic materials charged with carbon to make them conductive are also useful.

Operation.—As the solutions percolate over the faces of the electrodes, they lose reactants and become enriched with reaction products. At the anodic compartment, primarily nitrogen will be liberated by electrochemical oxidation of hydrazine. It will form an emulsion with the electrolyte. The other, cathodic, reaction product of hydrogen peroxide will be water. The electrochemical reactions are controlled, in part, by the flow rate of the electrolytic solutions and by the structural shape of the network of protuberances and depressions formed in the goffered electrodes. The output of the fuel cells can additionally be controlled to some extent by the concentration of the reactants in the electrolyte, and the temperature. It has been found that, in actual practice, control of the flow rate with a constant concentration of electrolyte is preferred.

The electrolyte at low concentration is only slightly conductive, and permits the use of catalysts such as cobalt black, palladium black, nickel black, Raney nickel and the like. At the cathodic side, the electrodes, if of silver, can be utilized as is; if the electrode is of another material, a thin layer of silver can serve as a catalyst. About 30 or so cells provide an output voltage close to 24 v. Electrolyte, conducted through the openings 39, 39' (FIG. 6) of the frame 35, and conducted through the microchannels 30, 30', to the face of the electrode, does not, however, have sufficient conductivity to interfere with high voltage operation; it has been found that a battery of about 180 elements can be operated in series with an open circuit output voltage of from 170 to 200 v., and with a total output loading power only slightly less than a similar battery subdivided into 6 sub-blocks of 30 elements each. The microgrooves 30 can be semi-circular, rectangular or similar in cross-sectional shape, may have a depth of about 15 to 30% of the thickness of the frame 35, that is, for a frame 35 of 0.25 mm. thickness, a depth and width of somewhere about 0.04 mm. to 0.10 mm.

The size and shapes of the connections from the ducts 39, 39', in FIG. 6 are different from that shown in FIG. 3; it has been found that good distribution of electrolyte is possible with the arrangement shown in FIG. 6, with somewhat better mechanical strength. Many different arrangements are possible. Openings 36 through the frames of the electrodes, and the membranes, are provided at suitable points to pass bolts therethrough and to assemble the half-cells into a complete battery unit. By providing suitable supply ducts to electrodes having the goffered surfaces and the dimensions above referred to and supplied with electrolyte at low concentration, a substantial number of cells can be made to operate together so that a complete operative battery is provided.

Various structural changes and modifications may be made in the battery assembly, the fuel cells, the shapes and aspect of the embossing patterns formed on the electrode and in the ducting arrangement, as determined, for example, by the requirements of particular applications and uses, chemical compositions of reactants and electrolytes, without departing from the inventive concept.

What is claimed is:

1. Stack of fuel cells comprising
an assembly of fuel cells in combination with a liquid electrolyte therein comprising
a stack of, alternatingly, electrodes and semipermeable diaphragms, adjacent sides of one electrode and one diaphragm forming half of an elementary fuel cell;
each electrode comprising
a thin fluid-impervious sheet of conductive material having an embossed, goffered surface formed with alternate protuberances and depressions, the protuberances spreading the flow of electrolyte and the depressions forming flow openings between the protuberances, the protuberances and depressions extending from the median plane of the sheet by about one tenth to several tenths of a millimeter, and directing electrolyte flow along the surface of the electrode sheet, the electrode sheet preventing flow of electrolyte across the thickness thereof;
said diaphragms and electrodes being formed with at least two pairs of openings adjacent to their edges to form, through the stack, supply and removal ducts for electrolyte extending perpendicularly to the median plane of the sheet electrodes and diaphragms;
fluid electrolyte charged with oxidizing reactant being supplied to one duct of one pair and being removed by the other duct of said one pair;
fluid electrolyte charged with reducing reactant being supplied to one duct of the other pair and being removed by the other duct of said other pair;
at least one of said fluid electrolytes being selected from the group consisting of (i) electrolyte containing non-regeneratable reactant in solution in said electrolyte, and (ii) electrolyte containing non-soluble gaseous or liquid reactant emulsified in said electrolyte;
channel means formed between said supply and removal ducts and the edge of the face of the electrode and communicating with said ducts and directed towards the edge of said electrodes to provide entrance and outlet openings for electrolyte communicating between the faces of said electrodes and said ducts, said electrolyte contained within said battery passing over said electrode surfaces with said flow impeding configuration; and
means securing said electrodes and semipermeable diaphragms of said cells in close proximity in stacked relation.

2. Stack according to claim 1, including spacer means located between said electrodes and said semipermeable diaphragms, the said spacer means consisting of a flat frame whose central part, facing the embossed part of the electrode, is open, said spacer means being formed with openings in the edges to form said supply and removal ducts, the edge of the said spacer having a thickness such that the total thickness formed by the edge parts of the electrode, of the diaphragm and of the spacer is the same as the total thickness formed by the elements at the center of the stack.

3. Stack according to claim 1, wherein the thickness of the sheet is in the order of a few hundredths to a tenth of a millimeter.

4. Stack according to claim 3, wherein the thickness of the sheet is about five hundredths of a millimeter; and the protuberance and depressions extend from the median plane of the sheet by a distance of about 0.2 to 0.3 mm.

5. Stack according to claim 1, wherein said electrode comprises an embossed sheet having the surface spreading the flow of electrolyte, the embossing pattern providing alternately projecting protuberances arranged substantially symmetrically and extending in opposite direction from the median plane of the sheet.

6. Stack according to claim 1, wherein the protuberances are staggered with respect to the main direction of flow of the electrolyte.

7. Stack according to claim 1, wherein said protuberances extend from the median plane of said electrode by a distance of about the base width of a protuberance, said distance being in the order of from one tenth to several tenths of a millimeter.

8. Stack according to claim 1, including edge frames surrounding the electrodes and the diaphragms and formed with said openings to form the supply and removal ducts; said channel means being microchannels formed in the edge frames having a groove width of from a few hundredths of a millimeter to about one millimeter and a groove depth of about 0.05 mm. to about 0.10 mm.

9. Stack according to claim 1, including edge frames surrounding said electrodes, said edge frames being of plastic and said electrodes being molded into inner marginal portions of said plastic edge frames, said channel means being formed by molding in said plastic edge.

10. Stack according to claim 1, including edge frames surrounding said diaphragms, said edge frames being of plastic and said diaphragms beng molded into inner marginal portions of said plastic edge frames.

11. Stack according to claim 1, including spacer means located between said electrodes and said semipermeable diaphragms, said spacer means being formed with said openings.

12. Stack according to claim 11, in which said channel means are made by cut outs in the edges of said spacer, between said openings forming supply and removal ducts, and the free open central part of said spacer.

13. Stack according to claim 1, wherein the length of said channel means is larged with respect to their depth and width to provide a hydraulic pressure drop and electrical high resistance in the electrolyte path from the ducts to the edges of the electrodes.

14. Stack according to claim 13, wherein the length of the channel means is in the order of about 1 cm.

15. Stack according to claim 1, wherein at least one side of the electrode is provided with a catalyst which comprises cobalt black, or palladium black, or nickel black, or Raney nickel.

16. Stack according to claim 1, wherein the stacks of electrodes and diaphragms is compressed, the projections of the protuberances of the electrodes being in contact with the adjacent diaphragm and elastically compressing the diaphragm.

17. Stack according to claim 1, wherein the electrode has a rectangular shape, the electrolyte entering by one edge and leaving by an opposite edge.

18. Stack according to claim 1, wherein the electrode is made of metal.

19. Stack according to claim 1, wherein the electrode is made of plastic material including an electrically conductive powder.

20. Stack according to claim 1, wherein said channel means formed between said supply and removal ducts direct electrolyte of different types to different sides of an electrode sheet and wherein said electrolyte contains non-regeneratable reactant in solution in said electrolyte.

21. Stack accordingly to claim 1, wherein said electrode is bipolar and wherein said electrolyte contains non-soluble gaseous or liquid reactant emulsified in said electrolyte.

References Cited

UNITED STATES PATENTS

| 3,215,563 | 11/1965 | Clemm | 136—86 D |
| 3,351,492 | 11/1967 | Heyes et al. | 136—86 D |
| 2,384,463 | 9/1945 | Gunn et al. | 136—86 R |
| 2,980,749 | 4/1961 | Broers | 136—86 R |
| 3,313,656 | 4/1967 | Blomgren et al. | 136—86 R |
| 3,365,333 | 1/1968 | Vulstich et al. | 136—86 R |

FOREIGN PATENTS

| 1,379,800 | 10/1964 | France | 136—86 R |
| 1,399,765 | 4/1965 | France | 136—86 R |

ALLEN B. CURTIS, Primary Examiner

U.S. Cl. X.R.

136—120 FC